US008631122B2

(12) United States Patent
 Kadam et al.

(10) Patent No.: US 8,631,122 B2
(45) Date of Patent: Jan. 14, 2014

(54) DETERMINING DEMOGRAPHICS BASED ON USER INTERACTION

(75) Inventors: Rajeev Anand Kadam, San Jose, CA (US); Vishal Harshvardhan Sankhla, Santa Clara, CA (US)

(73) Assignee: ViralHeat, Inc., San Jose, CA (US)

( * ) Notice: Subject to any disclaimer, the term of this patent is extended or adjusted under 35 U.S.C. 154(b) by 426 days.

(21) Appl. No.: 12/955,899

(22) Filed: Nov. 29, 2010

(65) Prior Publication Data

US 2012/0136959 A1    May 31, 2012

(51) Int. Cl.
 *G06F 15/16* (2006.01)
(52) U.S. Cl.
 USPC ........................................... 709/224; 709/225
(58) Field of Classification Search
 USPC .................................. 709/224, 225
 See application file for complete search history.

(56) References Cited

U.S. PATENT DOCUMENTS

| 7,756,755 | B2 | 7/2010 | Ghosh et al. |
| 7,873,638 | B2 * | 1/2011 | Young et al. ................. 709/224 |
| 8,250,096 | B2 | 8/2012 | Su et al. |
| 2007/0271234 | A1 | 11/2007 | Ravikiran |
| 2008/0059282 | A1 * | 3/2008 | Vallier et al. .................... 705/10 |
| 2009/0327120 | A1 | 12/2009 | Eze et al. |
| 2010/0114654 | A1 | 5/2010 | Lukose et al. |
| 2010/0114935 | A1 | 5/2010 | Polo-Malouvier et al. |
| 2010/0293566 | A1 * | 11/2010 | Valdez ........................... 725/14 |
| 2011/0022621 | A1 | 1/2011 | Luo et al. |
| 2011/0055196 | A1 * | 3/2011 | Sundelin et al. .............. 709/206 |
| 2011/0078173 | A1 | 3/2011 | Seligmann et al. |
| 2011/0145052 | A1 | 6/2011 | Lin et al. |
| 2012/0030210 | A1 | 2/2012 | Sankhla |
| 2012/0047219 | A1 * | 2/2012 | Feng et al. .................... 709/207 |

OTHER PUBLICATIONS

U.S. Appl. No. 12/889,267; Office Action mailed Dec. 17, 2012.

* cited by examiner

*Primary Examiner* — Patrice Winder
(74) *Attorney, Agent, or Firm* — Lewis Roca Rothgerber LLP

(57) ABSTRACT

Methods and systems for determining demographics based on user interaction are provided. Demographic information is maintained in association with certain indicators. Information regarding user interaction related to an item of interest is accessed, and indicators may be identified based on the user interaction information associated with a user. It is determined that the user belongs to one or more demographics based on the identified indicators, and a report may be generated.

21 Claims, 3 Drawing Sheets

DETERMINING DEMOGRAPHICS BASED ON USER INTERACTION

BACKGROUND OF THE INVENTION

1. Field of the Invention

The present invention generally relates to data analysis. More specifically, the present invention relates to determining demographics based on user interaction.

2. Description of the Related Art

Many modern websites and media outlets have a social or interactive aspect incorporated in their design. Around the world, billions of people consume video, news, and interact with games and each of those platforms allows users to interact with the content based on what is displayed on the screen. For example, more than a half billion users generate large amounts of data each day on U.S. social networks such as Twitter® and Facebook®. Other types of media websites (e.g., news sites) also include a social or interactive aspect where readers can comment, respond, or otherwise interact with the content on the site. Such content may include not only the originally published article, photo, video, etc., but also content posted by other users related to the original publication. For example, a news site may publish an article. In response, a user may provide feedback or questions in the comment section of that article. Responsive to the first user, other users may post their own feedback, answers to the question, or additional content to supplement the discussion.

While such user-generated data adds value to the content, the demographic breakdowns of the users interacting with the content are not well understood. Presently available ways to determining demographic information may involve, for example, determining a user's IP address. A user's IP Address may allow for geo-location of the user at a particular longitude and latitude. Based on the location, census data can be accessed, allowing for deduction as to likely demographic. Such a process may be error-prone, however, because the location of IP addresses is determined based on registration information, which may not necessarily be the location of the user. In addition, census information may be years out of date, since polling does not occur every years and demographic data may become out-of-date.

Another method of determining demographic involves a user's email address. An email address may be used as a marker to retrieve the user's social graph. A user may have an account on a social network, for example, and have provided demographic information (e.g., in a profile). Reliance on email is also highly error-prone, as users may not wish to provide email addresses and may therefore fail to provide one. In some instances, users may use a fake or back-up email address. Further, in some cases, having an email address may not be sufficient to access the user's profile (e.g., due to the user electing certain privacy options).

Cookies are often employed as a way to determine user demographics. A cookie may be downloaded to a user's computer, for example. If the user visits another site and provides demographics data, the demographic profile of that particular visitor may be aggregated. For example, if user A logs into site X and then goes to site Y and logs in and enters in their age, income, and education background, the subsequent visit to site X could provide the owner of site X a demographic picture of that visitor that was not available. While accurate data may be gleaned over time, it relies on the user to voluntarily provide relevant information. There may also be difficulties running the cookies on certain websites due to privacy and security concerns.

Some entities use registration and profiles to track information on their users. A website may require a user to register and fill out a profile in order to access and view content. Alternatively, a website may encourage users to register and fill out profiles by offering free access to desired content or some other incentive. Either way, demographic information may be determined based on the profiles provided by the users who log into the system to access the content. For example, a website can account for demographics based on the profiles of logged-in users who access a video posted on the website. This approach is limited, however, because not all websites require users to register and provide profile information. In some cases, users may be turned off by the extra steps required to register and fill out even a basic profile. Even already-registered users may not want to take the steps of logging in. For example, a user may not access content on a site often and may consequently forget their log-in name and password.

There is therefore a need for a robust method for determining accurate and timely demographic information.

SUMMARY OF THE INVENTION

Embodiments of the present invention provide methods and systems for determining demographics based on user interaction. Demographic information is stored in memory in association with certain indicators. Information regarding user interaction related to an item of interest is accessed, and indicators may be identified based on the user interaction information associated with a user. It is determined that the user belongs to one or more demographics based on the identified indicators, and a report may be generated.

Some embodiments include methods for determining demographics based on user interaction. Such methods may include maintaining information regarding a plurality of demographics in memory. Each demographic may be associated with a plurality of indicators. Methods may further include accessing information regarding user interaction related to an item of interest, identifying indicators in the user interaction information associated with a user, determining that the user belongs to one or more demographics based on the identified indicators, and generating a report including the determination that the user belongs to the one or more demographics.

Additional embodiments include systems for discerning human intent based on user-generated metadata. Such systems may include a memory for maintaining information regarding a plurality of demographics in association with indicators, an interface for accessing information regarding user interaction with an item of interest and a processor for executing instructions to identify one or more indicators in the user interaction information associated with a user, determine that the user belongs to one or more demographics based on the identified indicators, and generate a report including the determination that the user belongs to the one or more demographics. In some instances, the system may include a sensor, camera, and/or recognition software executable to identify characteristics of subjects being sensed or photographed.

In further embodiments of the present invention, computer-readable storage media is provided. Embodied on such computer-readable storage media may be a program that is executable by a processor to perform a method for determining demographics based on user interaction.

DETAILED DESCRIPTION

Methods and systems for determining demographic information from user interactions are provided. Demographic information is stored in memory in association with certain indicators. Information regarding user interaction related to an item of interest is accessed, and indicators may be identified based on the user interaction information associated with a user. It is determined that the user belongs to one or more demographics based on the identified indicators, and a report may be generated.

Figure 1A:
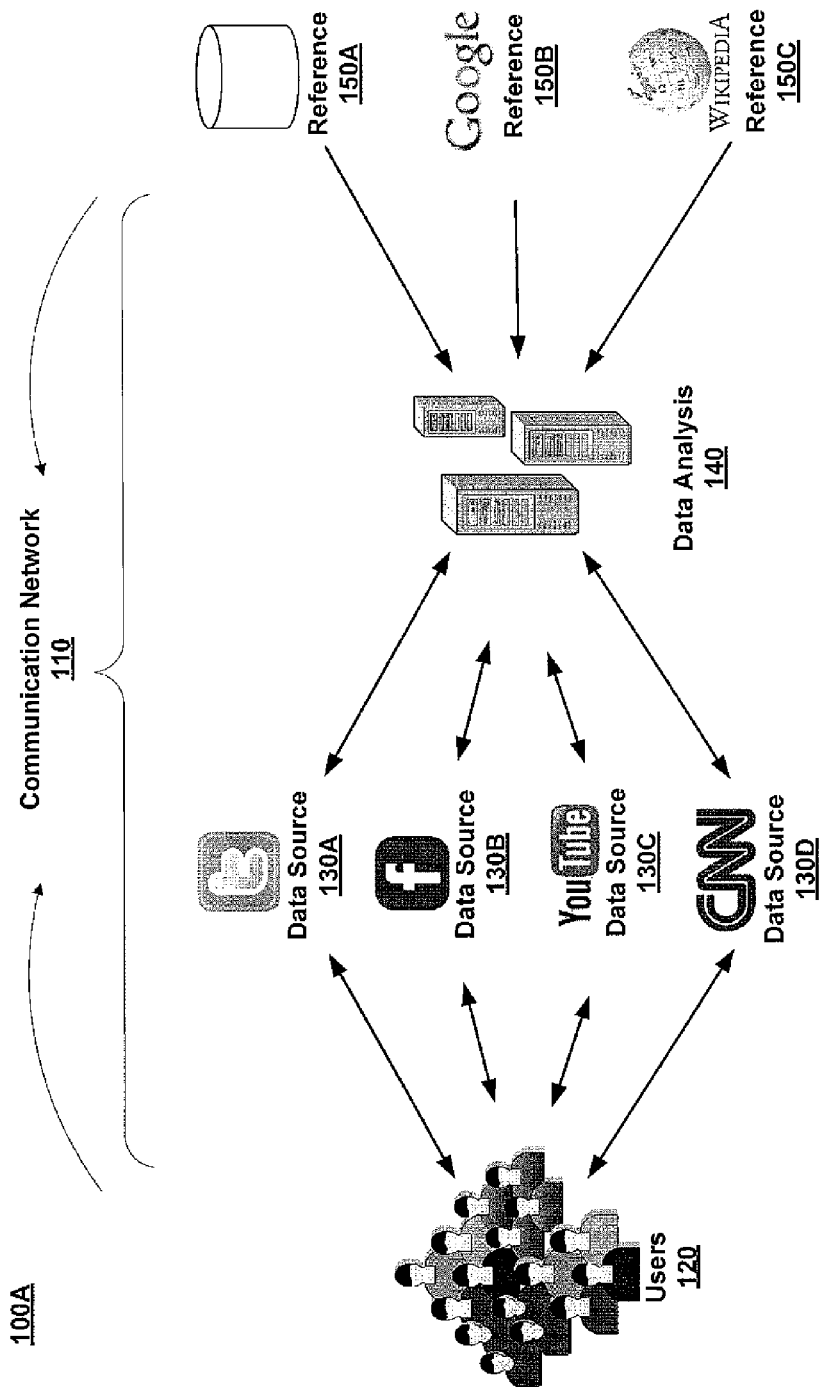
FIG. 1A illustrates a network digital environment in which a system for determining demographics based on user interaction may be implemented.

Various embodiments of the present invention involve examination of user interaction in almost any context, including online interaction with published content (e.g., video, photographs, blogs, articles, advertising), physical interaction with physical objects (e.g., gaming consoles, smart appliances), and feedback regarding a real or online business (e.g., kiosks). As such, a user may be an individual or an automated piece of technology that simulates or automates human behavioral processes FIG. 1A illustrates a network digital environment 100A in which a system for determining demographic information from user interactions may be implemented. Communicating via communication network 110, users 120 interact with content published on various social media sites 130A-130D. Information regarding the user interaction may be accessed and evaluated by data analysis servers 140, whose analyses may rely on information provided by references 150A-150C.

Communication network 110 may be inclusive of any local, proprietary network (e.g., an intranet), as well as any larger wide-area network. The communications network 110 may include a local area network (LAN), for example, which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of digital environment 100.

Users 120 may communicate through communication network 110 using any number of different electronic client or end-user devices such as a general-purpose computer, a mobile device such as a cellular phone, smartphone, a personal digital assistant (PDA), as well as a netbook (i.e., a miniature laptop computing device). Such users 120 may include any individual or group of individuals who voluntarily provides information to various forums.

Such forums may include various social media sites (e.g., social media sites 130A-130D). Social media sites generally allow users 120 to publish photographs, video, textual information (e.g., status updates, hyperlinks, bookmarks, blogs, microblogs, forum posts, comments), and otherwise interact with content (including content published by other users). Social media sites further allow users 120 interact with the media content on the sites and provide information regarding their daily activities, political views, cravings, product complaints, family issues, and general interests and musings. Media that may allow for and even solicit user interaction include videos, photos, news articles, and games. Common interactions may include commenting, indications of "Like," and sharing it with friends (e.g., reposting, "retweet"ing), submission to aggregator sites (e.g., Digg, del.ici.ous), and creating and sharing related content (e.g., video, art, photographs). Such interactions may create data (and metadata) that may be used to determine various characteristics of the users.

Social media sites generally supports and encourages such interaction in order to boost use and engagement among users 120. Information regarding such interactions may, either explicitly or implicitly, be used to discern user demographics. Such data can be aggregated from multiple data sources and analyzed to understand the demographic breakdown of the audience, as well as offer an extrapolated view of the total audience interacting with the type of content. For example, analyzing the generated metadata related to a news story and cross-comparing it with harvested social media profiles of interactive users may reveal information about age brackets, gender, income, location, political views, and educational background of the wider audience (including non-interactive users) accessing the content. In some cases, demographic information may also be included in a user profile in some social media sites. User profiles may further include personal information regarding age, gender, marital status, location, education, occupation, etc., as provided by the user.

For example, a user may watch an embedded video and post comments with feedback regarding the video. The user may even create their own version of the video and post it, as well soliciting and responding to comments with respect to created video. While such interactions may be indirectly related to the original video, such information may nevertheless be relevant and useful for demographic determination. Information regarding such user interactions, whether direct or indirect, with content published in data sources 130A-130D may be aggregated and sent to data analysis servers 140 for evaluation with respect to demographic. Specifically, the comments and related information regarding the user (e.g., user profile) may then be used by data analysis servers 140 to determine the demographics to which the user belongs.

Data analysis servers 140 can access user interaction information published within any of the social media sites 130A-130D (e.g., by downloading a feed, such as a firehouse feed or garden hose feed). Data analysis servers 140 may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Referring to the example above, information regarding user interaction with a video may be sent to data analysis server 140 for determination of demographics. The user's name (or username), for example, may be analyzed to determine whether a gender. Data analysis servers 140 may consult one or more third-party databases (e.g., references 150A-150C) in order to determine the likelihood that a name indicates a male or female gender (e.g., individuals named "John" are male 99.9% of the time). In addition to name analysis, the diction and sentence composition of the comments may be analyzed to determine likely educational background and/or income brackets. The comments themselves may indicate, directly or indirectly, demographic information about the user (e.g., "... here in San Francisco," "I may be 50 years old, but . . . "). Words in the comments may be evaluated and researched in references 150A-150C to determine whether they indicate anything about the user demographics. References 150A-150C may include any system providing information that may be used to evaluate the user interaction data. The data analysis servers 140 may further use machine learning, artificial intelligence (AI), natural language process (NLP), Bayesian filters and classifiers, and advanced information processing systems to identify demographics from the user interaction information.

Such information may be processed and included in compilations sent or exported to any applications 150A-150C associated with the partner. Such applications 150A-150C may include CRM systems 150A (e.g., Salesforce®), bug tracking systems application 150B (e.g., Bugzilla®), or project management systems 150C (e.g., Rally®), which may reside within the enterprise or exist as an online service. Other possible applications 150 that may receive such information include databases/data warehousing systems, reporting/analytics systems, business intelligence systems, support management systems, human resources systems, and project/product management systems.

Figure 1B:
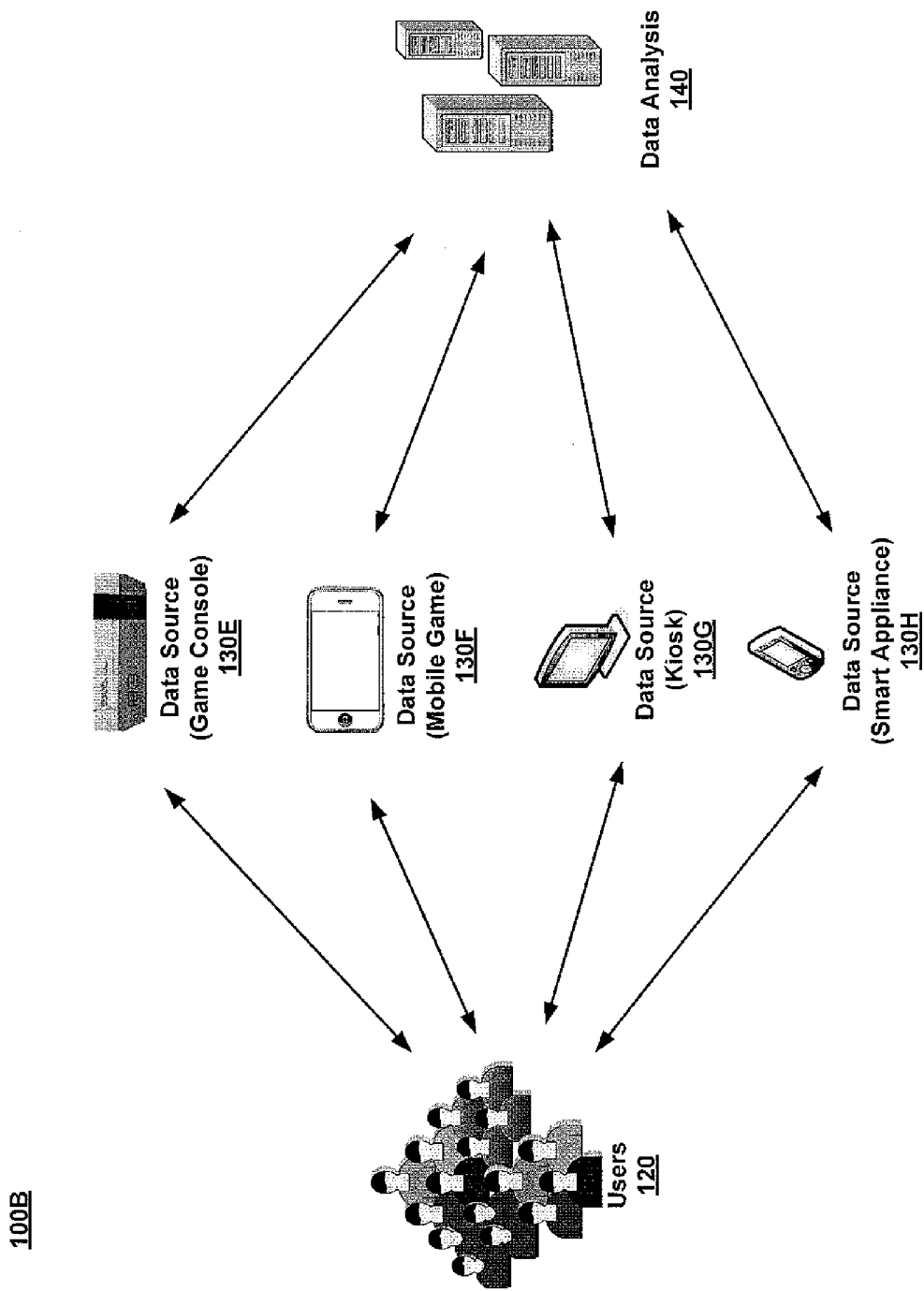
FIG. 1B illustrates an alternative environment in which a system for determining demographics based on user interaction may be implemented.

FIG. 1B illustrates an alternative environment 100B in which a system for determining demographics based on user interaction may be implemented. Unlike environment 100A where user interactions involves virtual interaction with content published on the Internet (e.g., using a computing device), user interaction with each of the data sources 130E-130H in environment 100B involves physical interaction at some interface. The data sources (e.g., data source 130E-130H) may or may not be coupled to a data analysis server 140 over a communication network (e.g., communication network 110 in FIG. 1A). In some instances, the data analysis may be performed by a device or processor residing at the data source 130E-130H. In some cases, the data regarding user interaction may be stored at the data source 130E-130H and later transferred to another device for data analysis, whether over a communication network, removable memory, or some other mode of data transfer known in the art.

One example of such an alternative environment 100B may be a game console 130E-130F. A user may physically interact with the game console 130E-130F via a game controller, keyboards, or any combination of peripheral input devices known in the art. When the user has successfully completed a level of a game, the user may be prompted for thoughts. The user may provide some form of response by selecting from a menu of answers, entering a comment, etc. Such a response may be analyzed using proprietary algorithms to determine gender, age, race, and income. In some cases, the analysis may be done by a processor in the game console 130E-130F. Alternatively, the analyses (and/or the information underlying such analyses) may be stored at the game console 130E-130F and later transferred to another device for further analysis and reporting. Mobile game console 130F may also be used to play social games (e.g., checking in on Yelp® or Foursquare®), where the game involves the user being in a physical location in order to play.

Another example may involve a vending or kiosk machines at a business. A user may patronizing a particular business may be asked to provide feedback at a kiosk. Such a kiosk may include a touchscreen display, keyboard, keypad, or other way to enter feedback. In addition to analyzing such feedback for demographic information, a kiosk may further include a camera, which may take a photograph of the user's face. Using recognition software, the photograph may be analyzed to determine age, gender, race, and even mood. Either alone or in combination with the user feedback/comments, such analysis may further be used to determine income, location, household size, and visit frequency. A kiosk may also keep interaction logs, which may be used to determine that a particular user has used the machine in the past. For example, the user may be particularly quick to navigate through screens to the comment section.

Another embodiment may include intelligent appliances. For example, an intelligent refrigerator may have the ability to catalog how often the user opens the refrigerator, add new items, and takes items out. Like the kiosk, the refrigerator may include a camera or other type of sensor/scanner. In conjunction with recognition software, the contents of the refrigerator may be identified. Such information may be used to determine, among other things, income level, eating habits, etc.

Such intelligence may also extend to other appliances/devices. A billboard, for example, may be equipped with a scanner capable of discerning people walking past it. In conjunction with recognition software, such a scanner may be able to identify and catalog facial structure, gender, age, race, clothing, if a person is holding any items, and walking speed. Data cataloged over a certain time period may reveal demographic information, such as income (e.g., whether the person is holding bags, from which shops, clothing style, watches or jewelry), race (e.g., facial structure analysis), age (e.g., facial structure), familial status (e.g., walking with another person or kids), and mood (e.g., facial structure).

Figure 2:
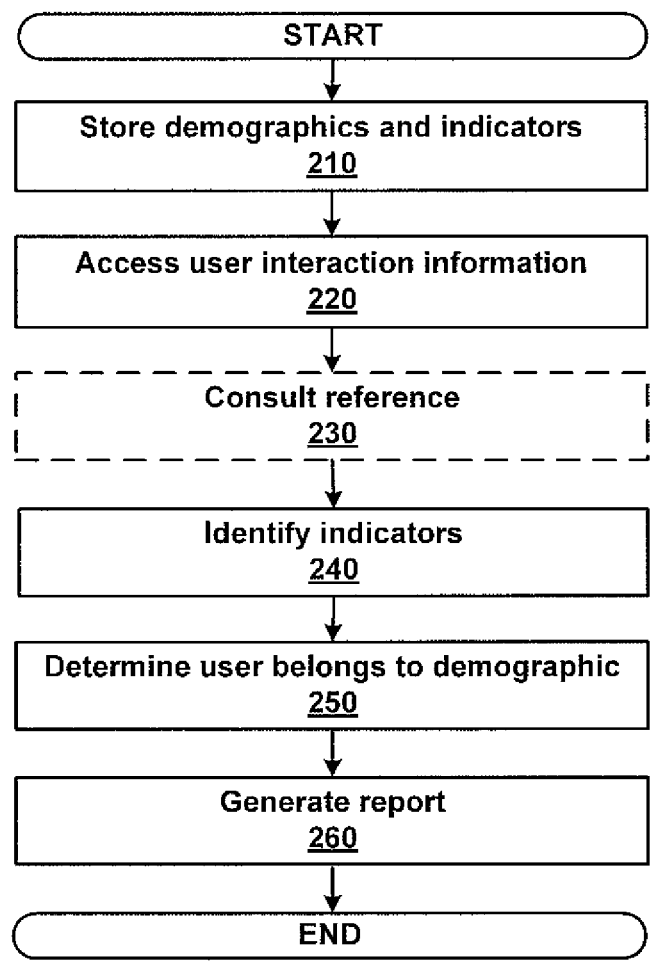
FIG. 2 is a flowchart illustrating an exemplary method for determining demographics based on user interaction.

FIG. 2 is a flowchart illustrating an exemplary method 200 for determining demographics based on user interaction. In the method, information regarding various demographics is stored in a database in memory. Information regarding user interaction with items of interest may be accessed and analyzed to identify indicators of demographics. The user performing the interaction is subsequently determined to belong to one or more demographics. A report may be generated including such a determination.

In step 210, information regarding demographics and indicators may be stored in memory. For example, characteristics of male and female demographics may be stored in memory. When that characteristic later appears in data being analyzed, therefore, the likely gender demographic can be determined. In some instances, the information may include links to external or third-party databases to supplement demographic data. For example, a names database may provide likely probabilities as to whether a particular name (or user ID name) has been found to be associated with a particular gender, ethnicity, religion, etc.

In step 220, information regarding user interaction is accessed. Such access may be obtained, for example, via a data feed associated with a social media site. User interaction information may be gathered from multiple data sources, not only from different websites, but from different parts of the same website. For example, a user may post a comment responding to an article posted on a friend's Facebook page, but also repost on his/her own page. In addition, the user may post comments related to the original article on other Facebook pages (e.g., a fan page). Whether in the context of news, advertising, or socializing, content that allows for interaction also allows for evaluation of the demographics of those doing the interaction.

Information regarding user interaction may occur virtually or physically. Where interaction occurs physically, an interface may be used to capture information regarding the user. Such interfaces may include cameras, scanners, and sensors.

Coupled with recognition software, information regarding the interactive user may be analyzed to determine detailed demographic information.

In step 230, a reference may be consulted to assist in the analysis. General and/or specialized databases may provide additional data that may supplement the level of detail that can be determined about users' demographics. For example, a user may use jargon that is specific to a particular profession or industry. The user may use a turn of phrase associated with a particular language or country. References with information regarding such jargon or such languages may be consulted to determine that the user is likely to belong to particular profession and country of origin.

In step 240, indicators may be identified in the user interaction information. In addition to what the user explicitly states in relation to a piece of content (e.g., in comments), additional data and metadata may be gathered and analyzed to see whether they shed light on demographics. For example, information about a user's participation on all pages of a website may be gathered and analyzed to determine waking hours, which may shed light on geographic location and/or type of occupation.

In some instances, the additional data gathered about the user includes profile data. Some profiles may explicitly provide demographic data for the user. Regardless, user profiles may at least provide additional information with which to determine demographic data. Listed preferences and interests, for example, may be associated with particular demographics.

Indicators may also be gathered through use of cameras, sensors, scanners, and other detection devices known in the art. Coupled with recognition software, which may be continually refined, such devices may capture information that may be used to help form a complete picture of the demographics to which a user belongs.

In step 250, it is determined that the user belongs to one or more demographics based on the indicators identified in step 240. The determination that a certain user interaction indicates a certain demographic may rely, at least in part, on information regarding demographics and indicators stored in memory. In some case, supplemental information regarding demographics and indicators may be provided by third-party references 150. The determination may further rely on information about the user that is gathered from other data sources (e.g., other pages, other forums, other websites).

In step 260, a report is generated including the determination that the user belongs to the demographics determined in step 250. The particular reports that are generated may depend on the purpose of the report. Such purposes may include market research, planning, behavior analysis, surveys, data modeling, etc. In some cases, data analysis servers 140 may export demographic data as a file (e.g., Microsoft Word®, Excel®, PDF, XML, JSON, SMS, email) to a recipient automatically, periodically, and/or upon request. The particular parameters for aggregating, organizing, and formatting such exported data may be specified by the specific recipient requesting such information.

The present invention may be implemented in an application that may be operable using a variety of end user devices. The present methodologies described herein are fully intended to be operable on a variety of devices. Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for determining demographics based on user interaction, the method comprising:
maintaining information regarding a plurality of demographics in memory, each demographic associated with a plurality of language usage indicators selected from the group consisting of diction, sentence composition, jargon, and phrasing;
accessing information over a communication network from a plurality of sources regarding user interaction related to an item of interest, the plurality of sources including at least one social media service; and
executing instructions stored in memory, wherein execution of the instructions by a processor:
aggregates the user interaction information from the plurality of sources,
identifies that the aggregated user interaction information associated with a user uses language in accordance with one or more of the language usage indicators,
determines that the user belongs to one or more demographics based on the identified language usage indicators identified in the aggregated user interaction information, and
generates a report including the determination that the user belongs to the one or more demographics.

2. The method of claim 1, wherein identifying the one or more language usage indicators includes accessing a profile of the user associated with the user interaction information and identifying the one or more language usage indicators from the profile.

3. The method of claim 2, wherein the profile associated with the user includes information regarding user interaction with other items.

4. The method of claim 1, further comprising consulting a reference to determine a likelihood that the language usage indicators are associated with the demographic, wherein the identification of the language usage indicators is based on the likelihood.

5. The method of claim 1, wherein the item of interest is published content and wherein the user interaction information related to the published content is accessed over a communication network from one or more data sources.

6. The method of claim 4, wherein accessing the user interaction information includes identifying the published content and metadata associated with the published content.

7. The method of claim 1, wherein the item of interest is a physical object and wherein accessing the user interaction information related to the physical object includes receiving information regarding the user interaction as detected by a sensor associated with the physical object.

8. The method of claim 1, wherein the item of interest is a business and wherein accessing the user interaction information related to the business includes receiving information from a customer at a location associated with the business.

9. The method of claim 1, wherein accessing the user interaction information includes use of a camera, further comprising executing recognition software to identify characteristics of one or more subjects photographed by the camera, wherein the determination that the user belongs to the one or more demographics is further based on the identified characteristics.

10. A system for determining demographics based on user interaction, the system comprising:
   a memory for maintaining information regarding a plurality of demographics in memory, each demographic associated with a plurality of language usage indicators selected from the group consisting of diction, sentence composition, jargon, and phrasing;
   an interface for accessing information over a communication network from a plurality of sources regarding user interaction with an item of interest, the plurality of sources including at least one social media service; and
   a processor for executing instructions stored in memory, wherein execution of the instructions by the processor:
      aggregates the user interaction information from the plurality of sources,
      identifies that the aggregated user interaction information associated with a user uses language in accordance with one or more of the language usage indicators,
      determines that the user belongs to one or more demographics based on the identified language usage indicators identified in the aggregated user interaction information, and
      generates a report including the determination that the user belongs to the one or more demographics.

11. The system of claim 10, wherein the interface is further configured to access a profile of the user associated with the user interaction information and wherein identification of the one or more language usage indicators includes identifying the one or more language usage indicators from the profile.

12. The system of claim 11, wherein the profile associated with the user includes information regarding user interaction with other items.

13. The system of claim 10, wherein further execution of instructions by the processor determines that each of the stored plurality of demographics in memory is associated with the plurality of language usage indicators, each determination based on a likelihood that the language usage indicators are associated with the demographic.

14. The system of claim 10, wherein the item of interest is published content and wherein the interface accesses the user interaction information related to the published content over a communication network from one or more data sources.

15. The system of claim 10, wherein the item of interest is a physical object and wherein the interface includes a sensor for detecting user interaction associated with the physical object.

16. The system of claim 10, wherein the item of interest is a business and wherein the interface receives information from a customer at a location associated with the business.

17. The system of claim 10, wherein the interface includes a camera and further comprising recognition software stored in memory and executable by the processor to identify characteristics of one or more subjects photographed by the camera, wherein the determination that the user belongs to the one or more demographics is further based on the identified characteristics.

18. A non-transitory computer-readable storage medium having embodied thereon a program, the program being executable by a processor to perform a method for determining demographics based on user interaction, the method comprising:
   maintaining information regarding a plurality of demographics in memory, each demographic associated with a plurality of language usage indicators selected from the group consisting of diction, sentence composition, jargon, and phrasing;
   accessing information over a communication network from a plurality of sources regarding user interaction related to an item of interest, the plurality of sources including at least one social media service;
   aggregating the user interaction information from the plurality of sources;
   identifying that the aggregated user interaction information associated with a user uses language in accordance with one or more of the language usage indicators;
   determining that the user belongs to one or more demographics based on the identified language usage indicators in the aggregated user interaction information; and
   generating a report including the determination that the user belongs to the one or more demographics.

19. The non-transitory computer-readable storage medium of claim 18, wherein the item of interest is published content and wherein the user interaction information related to the published content is accessed over a communication network from one or more data sources.

20. The non-transitory computer-readable storage medium of claim 18, wherein the item of interest is a physical object and wherein accessing the user interaction information related to the physical object includes receiving information regarding the user interaction as detected by a sensor associated with the physical object.

21. The non-transitory computer-readable storage medium of claim 18, wherein the item of interest is a business and wherein accessing the user interaction information related to the business includes receiving information from a customer at a location associated with the business.

* * * * *